United States Patent [19]

Engelbrecht

[11] Patent Number: 4,888,871
[45] Date of Patent: Dec. 26, 1989

[54] DRIVING HEAD FOR LINE CUTTING DEVICES

[75] Inventor: Fillippus T. Engelbrecht, Potchefstroom, South Africa

[73] Assignee: Centiforce (Proprietary) Limited, South Africa

[21] Appl. No.: 295,669

[22] Filed: Jan. 11, 1989

[51] Int. Cl.$^4$ .................. B26B 7/00; A01D 35/00
[52] U.S. Cl. ........................... 30/276; 56/12.5
[58] Field of Search ............ 30/276, 279, 307, 272 R, 30/357, 349, 348, 376.55, 346.59, 161, 162; 56/12.5

[56] References Cited

U.S. PATENT DOCUMENTS

| | | | |
|---|---|---|---|
| 4,566,189 | 1/1986 | Muto | 30/276 |
| 4,571,831 | 2/1986 | White, III | 30/276 |
| 4,660,286 | 4/1987 | Engelbrecht et al. | 56/12.5 |
| 4,685,279 | 8/1987 | Gullott | 30/276 |
| 4,790,071 | 12/1988 | Helmig et al. | 30/276 |

Primary Examiner—Frank T. Yost
Assistant Examiner—Paul M. Heyrana, Sr.
Attorney, Agent, or Firm—Larson and Taylor

[57] ABSTRACT

A driving head for a line cutter device includes a base part; a spool driver; mounting means for mounting a spool, on the spool driver; and a set of teeth circumferentially distributed on the spool driver. An operating member is connected to the base part and having oppositely a first and a second end and a first detent at the first end and a second detent at the second end, the detents being adapted for cooperating selectively with one of the teeth of the set of teeth on the spool driver, the first end being heavier than the second end. Biasing means biases the operating member. The biasing means is such that when the operating member is rotated faster than a predetermined rotational speed the centrifugal force of the operating member acting on the biasing means causes it to be counteracted to disengage the second detent from the tooth with which it is engaged thereby allowing slippage between the operating member and the spool driver so that an increment of line is fed out from a spool mounted in the driving head and bringing the first detent into cooperation with a tooth of the set of teeth.

3 Claims, 10 Drawing Sheets

DRIVING HEAD FOR LINE CUTTING DEVICES

FIELD OF INVENTION

The present invention relates to driving heads for line cutting devices.

BACKGROUND TO INVENTION

Several line cutting devices are known. A number of these devices are of the so-called automatic feed type where, by way of a particular operation the cutting line, provided on a spool, is fed out automatically for extending it when it has been broken off or has been shortened otherwise. These mechanisms do not always operate well.

It is an object of the invention to suggest another type of line cutting device which will assist in overcoming this problem.

SUMMARY OF INVENTION

According to the invention, a driving head for a line cutter device includes (a) a base part;

(b) a spool driver, the spool driver being rotatably mounted relative to the base part;

(c) mounting means for mounting a spool, on which a cutting line is wound, on the spool driver;

(d) a set of teeth circumferentially distributed on the spool driver;

(e) an operating member connected to the base part and having oppositely a first end and a second end and a first detent at the first end and a second detent at the second end, the detents being adapted for cooperating selectively with one of the teeth of the set of teeth on the spool driver, the first end being heavier than the second end;

(f) biasing means for biasing the operating member in a direction in which the second detent cooperates with one of the teeth of the set of teeth and the first detent being out of cooperation with the teeth of the set of teeth, the biasing means being such that when the operating member is rotated faster than a predetermined rotational speed the centrifugal force of the operating member acting on the biasing means causes it to be counteracted to disengage the second detent from the tooth with which it is engaged thereby allowing slippage between the operating member and the spool driver so that an increment of line is fed out from a spool mounted in the driving head and bringing the first detent into cooperation with a tooth of the set of teeth;

(g) connection means for drivingly connecting the base member to a rotating power source; and (h) guide means in the base part for guiding cutting line from a spool mounted on the spool driver.

The operating member may a rectangular frame and in which guiding means are provided for guiding the operating member on the spool driver.

The biasing means may include a coil spring acting between the base part and the operating member.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
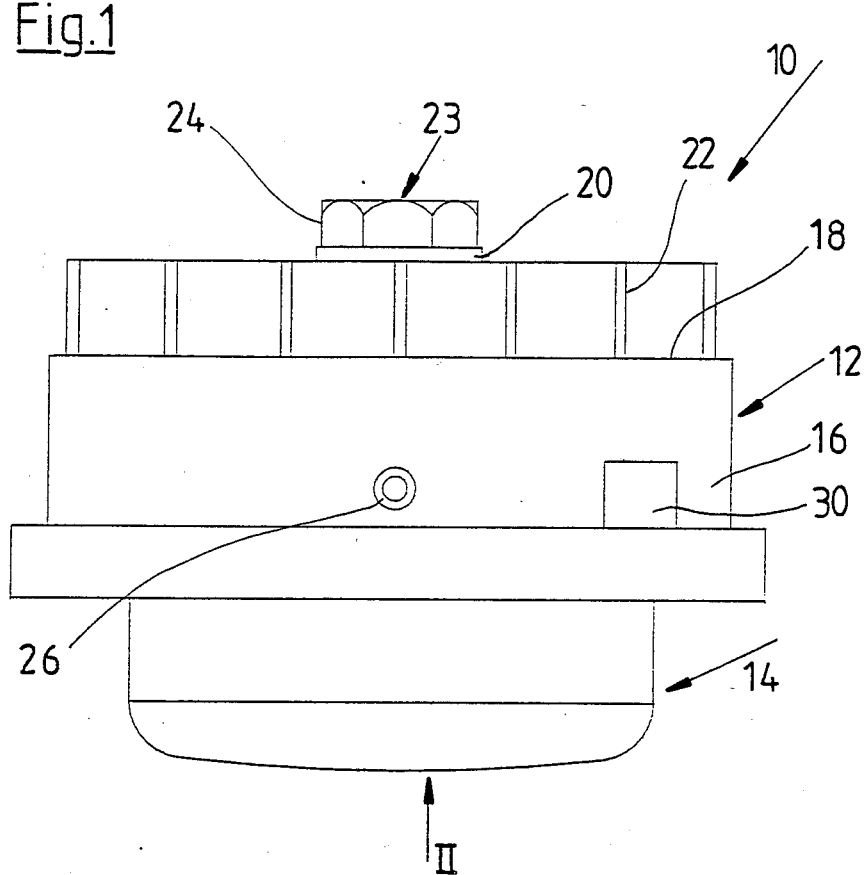
FIG. 1 a side elevation of a driving head for a flexible line cutting device in accordance with the invention.
Figure 2:
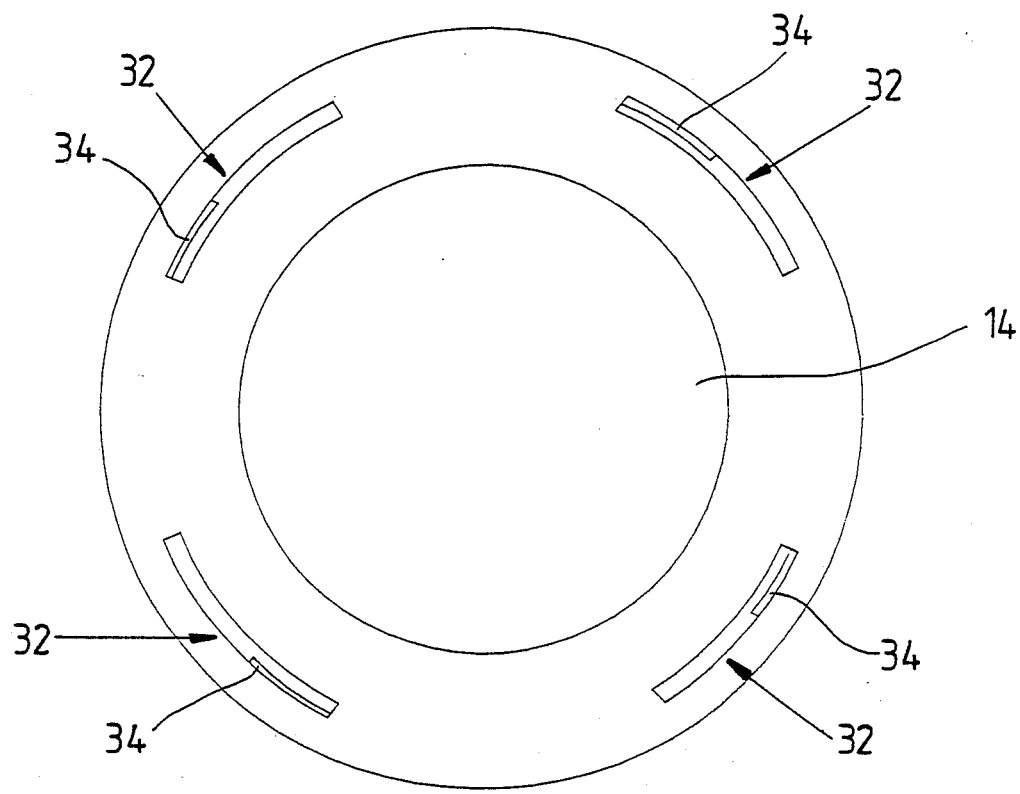
FIG. 2 a view from below seen along arrow II in FIG. 1.

Referring to FIGS. 1 and 2, the driving head, generally indicated by reference numeral 10, includes a body 12 to which is fitted a dome-shaped cover 14. The body 12 has a cylindrical side wall 16 and a transverse top wall 18 from the centre of which a boss 20 protrudes. A series of radial vanes 22 extend outwardly from the boss 20 and terminate substantially flush with the side walls 16. The boss 20 has a hexagonal socket 23, which extends downwardly by means of an axial bore and which passes through the top wall 18. A mounting shaft, generally indicated by reference 24, and which will be described in more detail hereafter, fits into the socket of the boss 20 and has a shank which passes through the top wall 18 into the interior of the body 12. The shaft 24 connects the head to a driven shaft of a power tool (see FIG. 10).

Two diametrically opposed apertures 26 are provided in the side walls 16. Through these apertures 26 the line cutter is fed as will be explained hereafter. Both apertures are shown in FIGS. 3 and 4 and one is shown in FIG. 1.

The lower edge of the body 12 is formed with four latch elements 28 (refer in particular to FIG. 3) and with a flexible detent 30. The cover 14 is provided with four bayonet type connection formations 32. When the cover 14 is fitted to the body in the correct position, the latch elements 28 come into cooperating relationship with the connecting structures 32 whereafter the body 12 and 14 are turned relatively to one another so as to slide the latch elements 28 under the connecting portions (indicated by references numerals 34 and 32) of the connecting structures. The detent 30, as can best be seen in FIG. 3, is close to one of the elements 28 and also comes into cooperating relationship with one of the connecting structures 32. The arrangement is such that once the cover 14 has been secured to the body 12 it cannot be rotated off the body unless the detent 30 is pressed inwardly to disconnect it from the cover 14.

Figure 3:
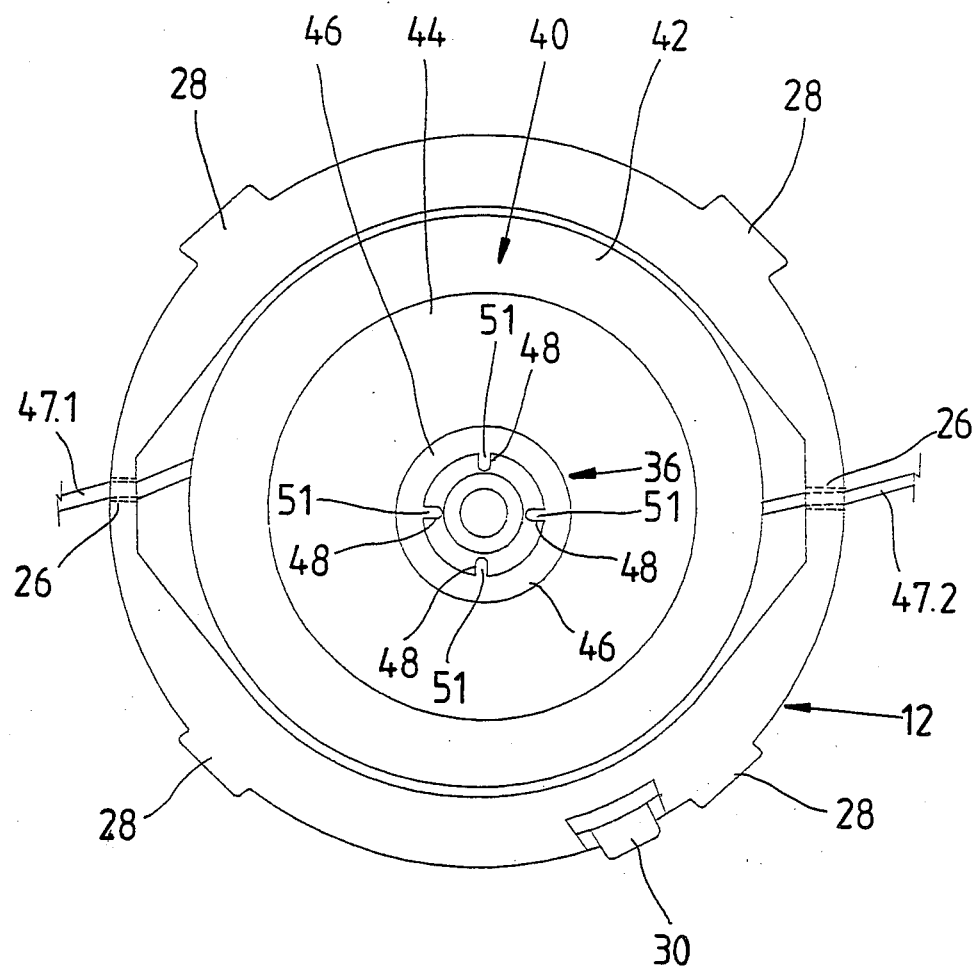
FIG. 3 a view corresponding to FIG. 2 but with the cover removed.
Figure 4:
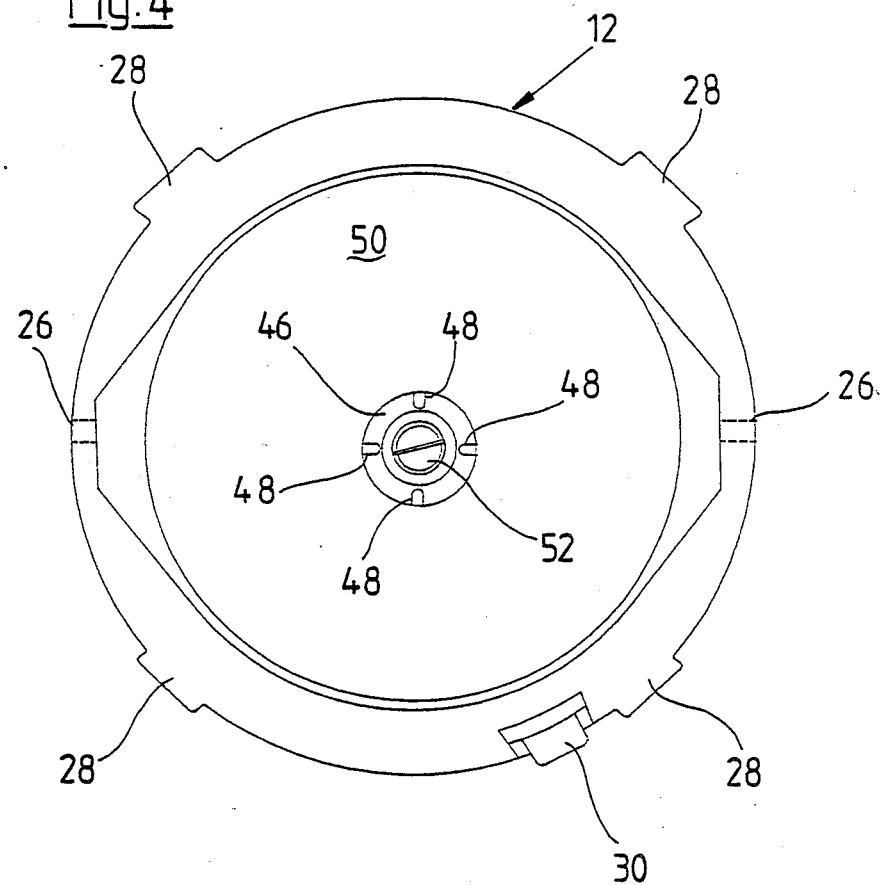
FIG. 4 a view corresponding to FIG. 3 but with the spool removed.
Figure 5:
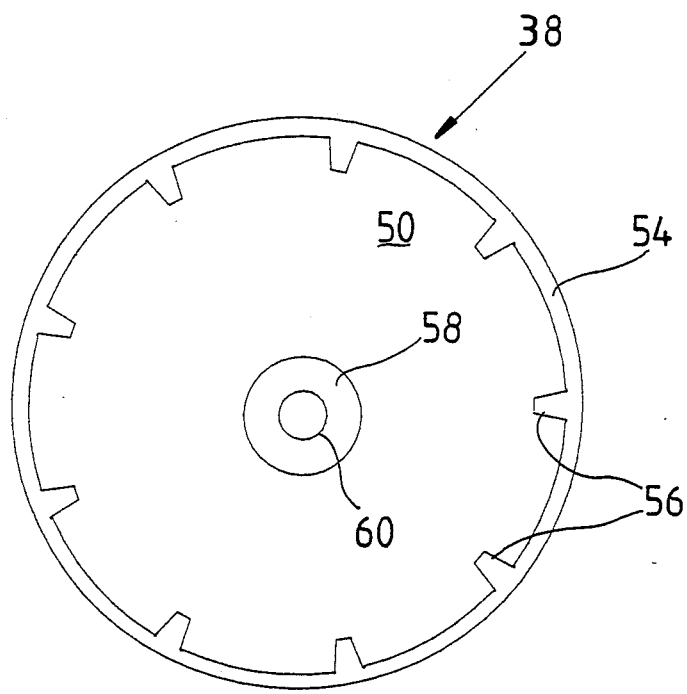
FIG. 5 a plan view seen along arrows V—V in FIG. 7.

Referring now to FIGS. 3 and 4, reference numeral 36 refers to the hollow central shaft of a spool driver generally indicated by reference numeral 38 (see FIG. 5). The spool driver 38 is not visible in FIG. 3 as it is concealed by the spool 40. The spool 40 includes two flanges which have been designated 42 and 44 and a sleeve 46, which joins the two flanges 42 and 44. The flexible line of the cutter is wound onto the sleeve 46 between the two flanges 42 and 44. Two lines are wound onto the spool each of these emerging through one of the apertures 26 (the lines being indicated by reference numerals 47.1 and 47.2 respectively in FIG. 3).

The hollow central shaft 36 of the spool driver 38 is formed with four axially extending external grooves 48. The grooves 48 extend from one end of the hollow shaft 36 towards the disc 50, which constitutes the remainder of the spool driver 38. The grooves 48 do not reach the disc 50 but "run out" before doing so. The sleeve 46 is formed with four inwardly directed teeth 51, one of each fitting into one of the grooves 48 thereby to render the spool driver 38 and spool 40 fast in rotation with one another.

The hollow central shaft 36 receives a stud 52. The stud 52 has a head with a screwdriver slot in it and a short threaded shank.

The shaft 24 protrudes downwardly through the top wall 18, through a mounting plate which is secured to the underside of the top wall and which will be described in more detail hereinafter and into the interior of the shaft 36. The shaft 24 has, at the lower end thereof as viewed in FIG. 1, a tap blind ball, which is compatible with the stud 52. When the stud 52 is screwed into the end of the shaft 24 the spool driver 38 is prevented from moving axially with respect to the central mount thus created but can rotate with respect thereto.

Referring now to FIG. 5, the disc 50 of the spool driver is extended upwardly, as viewed in FIG. 1 by a circumferentially extending peripheral wall 54. Protruding radially inwardly from the wall 54 are a plurality of teeth 56. The top face of the disc 50 is further recessed at 58 to receive a guide boss, as will be described in more detail hereinafter, and has a central opening 60 through which the stud 52 passes.

Figure 6:
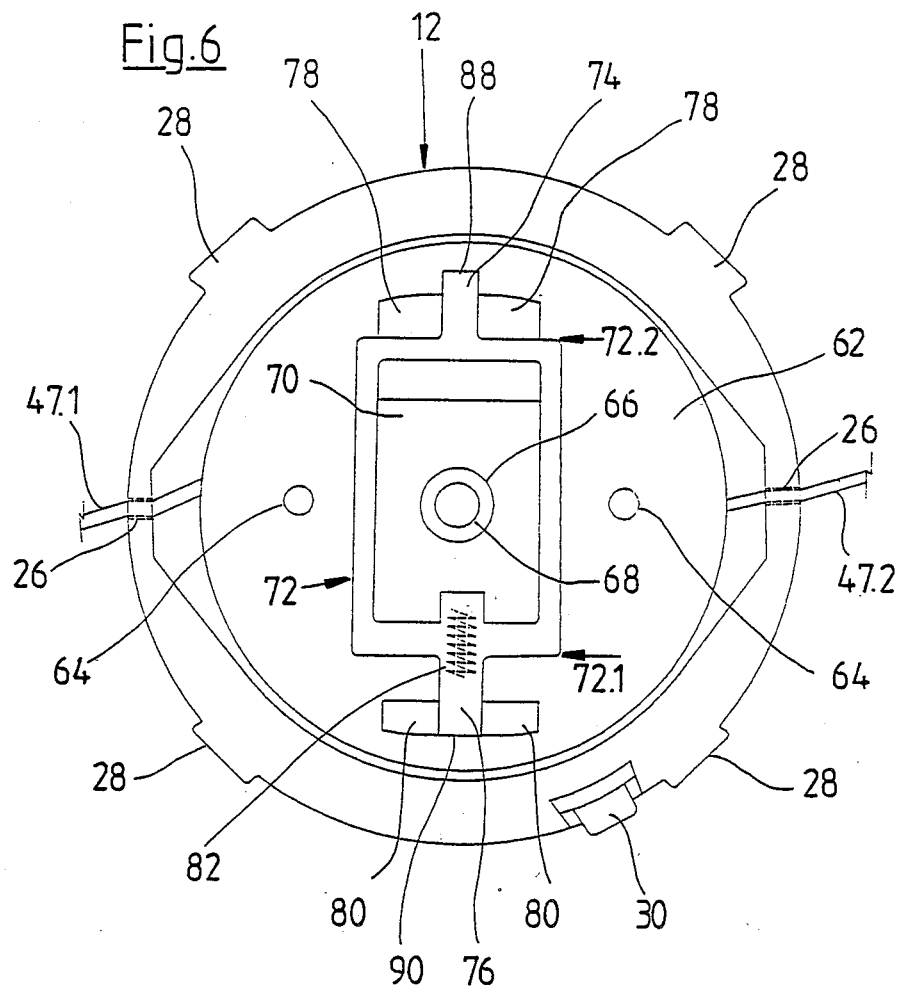
FIG. 6 a view corresponding to FIGS. 3 and 4 but with the spool and its support disc removed (also as seen along arrows VI—VI in FIG. 7)

Referring to FIG. 6, a mounting plate 62 is secured, by means of the studs 64, to the underside of the top wall 16. The plate 62 has a central boss 66 protruding from the underside thereof and there is an opening 68 on the boss into which the shaft 24 is moved.

Figure 7:
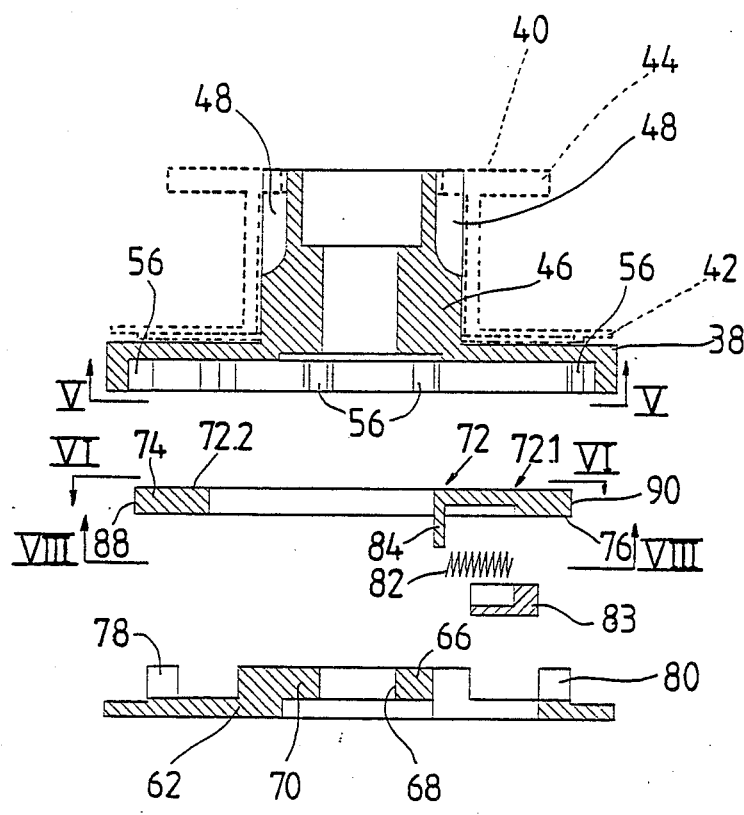
FIG. 7 an exploded sectional side view of various parts of the driving head illustrated in FIGS. 1 to 6 but excluding the outer housing and the lid.

A raised platform 70 surrounds the boss 66. The platform 70 is generally rectangular in plan view and is surrounded by an operating member 72. The member 72 comprises a rectangular frame with teeth engaging detent 74 and 76 protruding in opposite directions from the shorter sides of the frame. On each side of the detent 74 the plate 62 has two raised blocks 78, the detent 74 sliding between and being guided by the raised blocks 78. Likewise, on each side of the detent 76 there are two raised blocks 80 which guide and strengthen the detent 76. As is shown in FIG. 7 one end of a spring 82 is anchored to a cup 83 fitted to the plate 62. The other end of the spring 82 is anchored to a pin 84 which extends from the member 72. The spring 82 pushes the member 72 into the position illustrated in FIG. 6.

The detent 74 is bounded by a flat end face 88 and the detent 76 by a flat end face 90.

As can be seen the end 72.1 of the member 72 is heavier than the end 72.2 due to the thickness of the cross-bar and the larger size of the dent 76 as compared to the detent 74.

FIG. 7 shows various parts of the driving head in exploded view and so as to explain their relative connection and operation.

The speed of the motor connected to the shaft 24 increases as the cutting lines 47.1, 47.2 wear down. While the speed of the motor remains above a certain level, the member 72 occupies the position shown in FIG. 8. The detent 74 is in engagement with one of the teeth 56 (ie. tooth 56.1) and drive is transmitted through the member 72 to the spool driver 38 and hence to the spool 40. Thus the entire structure disclosed rotates as a unit. The direction of rotation is indicated by reference numeral 92 in FIG. 8.

Figure 8:
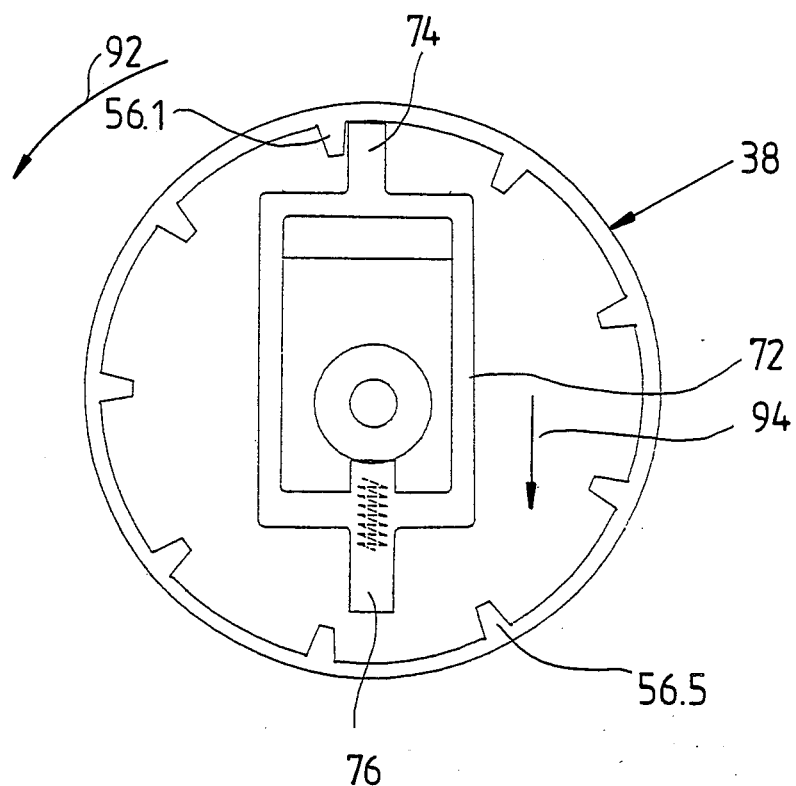
FIG. 8 a view from below of the spool driver seen along arrow VIII—VIII in FIG. 7 shown in one position.
Figure 9:
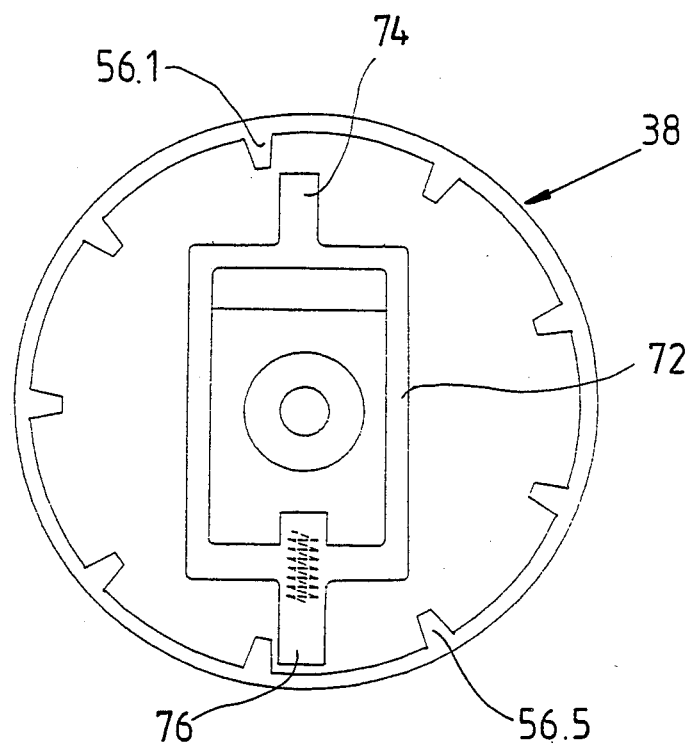
FIG. 9 a view corresponding to FIG. 8 but with the spool driver in another position.

When the motor speeds up, centrifugal force acting on the member 72 overcomes the pull of the spring 82 and the member 72 moves transversely from the position illustrated in FIG. 8 in the direction of arrow 94. The detent 74 disengages from the tooth 56.1 on the spool 40 with which it was engaged and as a result the spool and the spool driver lag behind the member 72 and other driver parts. This feeds out an increment of each line 47.1, 47.2. Also the frictional pull of the line 47.1, 47.2 (either on being in contact with vegetation being cut or due to the frictional contact with the side surfaces of the apertures 26) will assist to pull the line off the spool 40 so that the line 47.1, 47.2 is fed for a small increment.

The detent 76 is engaged by a tooth 56.5 before the detent 74 reaches the tooth adjacent the one from which it has just disengaged. The surface 90 as it engages the tooth 56.5 pushes the member 72 in the direction of arrow 94. The detent 74 does move into the path of the adjacent tooth and further line feeding is then prevented unless the centrifugal force on the member 72 is sufficient to move it back and disengage the detent 76 from the tooth 56.5 against the action of the spring 82. If this happens, another increment of line 47.1, 47.2 is fed out upon the sequence just specified occurring again.

The member 72 can be turned over so that the flat face of the detent 76 cooperates with one of the teeth 56. The head is then semi-automatic and not automatic. This means that the motor must be slowed to promote feeding of line.

Figure 10:
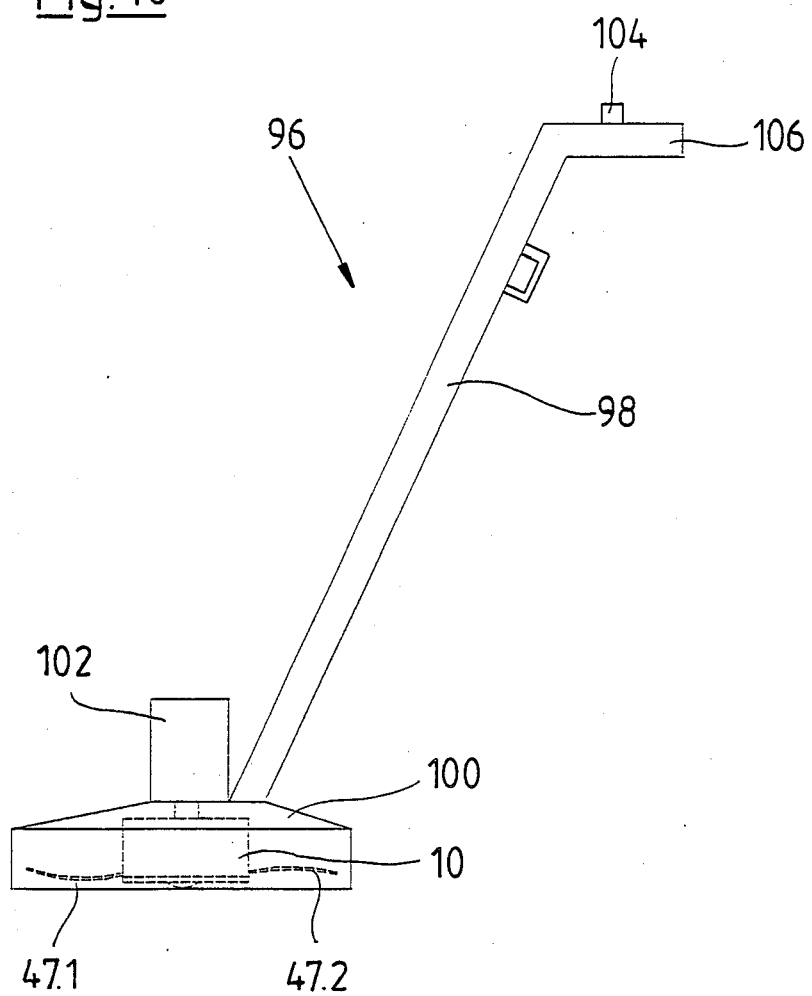
FIG. 10 on a reduced scale, a side view of a conventional line cutting device which may have a cutting head as illustrated in FIGS. 1 to 9.

FIG. 10 shows a cutting device 96 having a handle 98 with a base frame structure 100 on which an electrical motor 102 is mounted. The shaft of the motor 102 is operatively connected to a driving head 10 as illustrated in FIGS. 1 to 9. The rotation of the motor 102 is controlled by means of a switch 104 provided on the hand grip 106.

I claim:

1. A driving head for a line cutter device, which head includes
   (a) a base part;
   (b) a spool driver, the spool driver being rotatably mounted relative to the base part;
   (c) mounting means for mounting a spool, on which a cutting line is wound, on the spool driver;
   (d) a set of teeth circumferentially distributed on the spool driver;
   (e) an operating member connected to the base part and having oppositely a first end and a second end and a first detent at the first end and a second detent at the second end, the detents being adapted for cooperating selectively with one of the teeth of the set of teeth on the spool driver, the first end being heavier than the second end;
   (f) biasing means for biasing the operating member in a direction in which the second detent cooperates with one of the teeth of the set of teeth and the first detent being out of cooperation with the teeth of the set of teeth, the biasing means being such that when the operating member is rotated faster than a predetermined rotational speed the centrifugal force of the operating member acting on the biasing means causes it to be counteracted to disengage the second detent from the tooth with which it is engaged thereby allowing slippage between the operating member and the spool driver so that an increment of line is fed out from a spool mounted in the driving head and bringing the first detent into cooperation with a tooth of the set of teeth;

(g) connection means for drivingly connecting the base member to a rotating power source; and (h) guide means in the base part for guiding cutting line from a spool mounted on the spool driver.

2. A driving head as claimed in claim 1, in which the operating member is a rectangular frame and in which guiding means are provided for guiding the operating member on the spool driver.

3. A driving head as claimed in claim 1, in which the biasing means includes a coil spring acting between the base part and the operating member.

* * * * *